United States Patent [19]

Preisinger

[11] 4,124,185
[45] Nov. 7, 1978

[54] BAG HOLDER

[76] Inventor: Carl M. Preisinger, 691 Bryan, Elmhurst, Ill. 60126

[21] Appl. No.: 811,200

[22] Filed: Jun. 29, 1977

[51] Int. Cl.² .............................................. A63B 55/08
[52] U.S. Cl. ...................................... 248/98; 248/101; 248/201; 248/218.4; 248/225.2
[58] Field of Search ...................... 248/98, 97, 99, 101, 248/224.4, 225.1, 225.3, 226.5, 230, 218.4, 201, 229, 220.2, 225.2; 280/47.26, 654

[56] References Cited

U.S. PATENT DOCUMENTS

| 122,685 | 1/1872 | Van Brocklin | 248/98 |
| 488,851 | 12/1892 | Stock | 248/99 X |
| 1,548,986 | 8/1925 | Donovan | 248/99 |
| 1,631,355 | 6/1927 | Baldwin | 248/229 |
| 1,815,353 | 7/1931 | Gerow et al. | 248/230 X |
| 2,064,696 | 12/1936 | Smith et al. | 248/99 X |
| 2,140,199 | 12/1938 | Constantine | 248/98 X |
| 2,152,018 | 3/1939 | Barnhart | 248/97 |
| 2,156,025 | 4/1939 | Paul | 248/230 |
| 2,912,206 | 11/1959 | Ferris et al. | 248/229 |
| 3,104,762 | 9/1963 | LaHive | 248/99 X |
| 3,273,846 | 9/1966 | DeMare | 248/229 X |
| 3,313,508 | 4/1967 | Mancl | 248/229 |
| 3,614,041 | 10/1971 | Koger | 248/97 |
| 3,838,839 | 10/1974 | Spencer | 248/97 X |
| 3,841,592 | 10/1974 | Witten | 248/98 X |
| 3,845,968 | 11/1974 | Larson | 248/98 X |
| 3,870,261 | 3/1975 | McSwain | 248/98 X |
| 3,992,034 | 11/1976 | Smith et al. | 248/98 X |

FOREIGN PATENT DOCUMENTS

| 114,185 | 6/1969 | Denmark | 248/99 |
| 2,155,350 | 5/1973 | Fed. Rep. of Germany | 248/98 |

Primary Examiner—Rodney H. Bonck
Attorney, Agent, or Firm—Dressler, Goldsmith, Clement, Gordon & Shore, Ltd.

[57] ABSTRACT

A specially configured bag holder for releasably securing a trash bag or the like. The bag holder has a hoop with an annular shoulder for carrying the bag, a spring-biased cord for releasably retaining the bag on the hoop, a rigidifying structure including a U-shaped brace with rigidifying arms and a mounting bar which engage the hoop, and at least one removable bracket assembly mounted upon a support structure such as a wheeled cart, post or wall. The removable bracket assembly includes an upright support lug and a fastening assembly for securing the lug to the support structure while simultaneously spacing the lug from the support structure to define a pocket between the support structure and the lug to receive the mounting bar.

7 Claims, 8 Drawing Figures

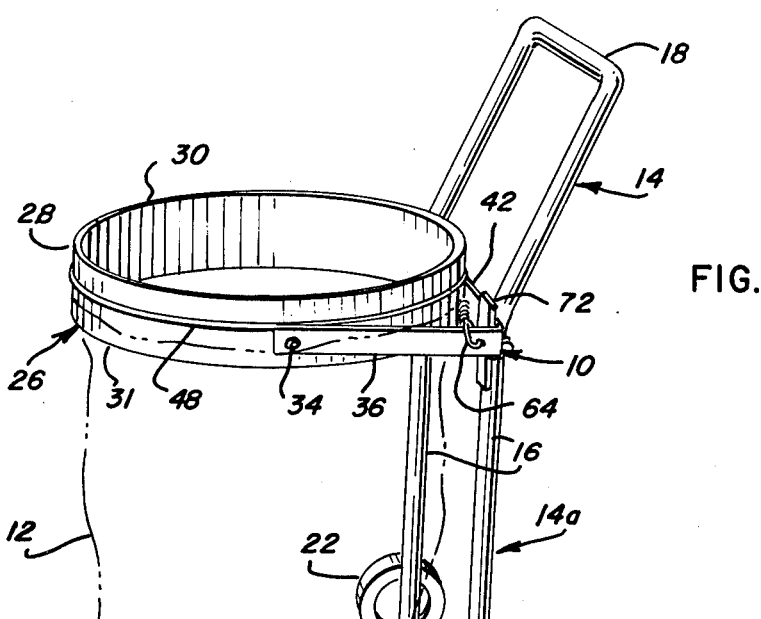
FIG. 1
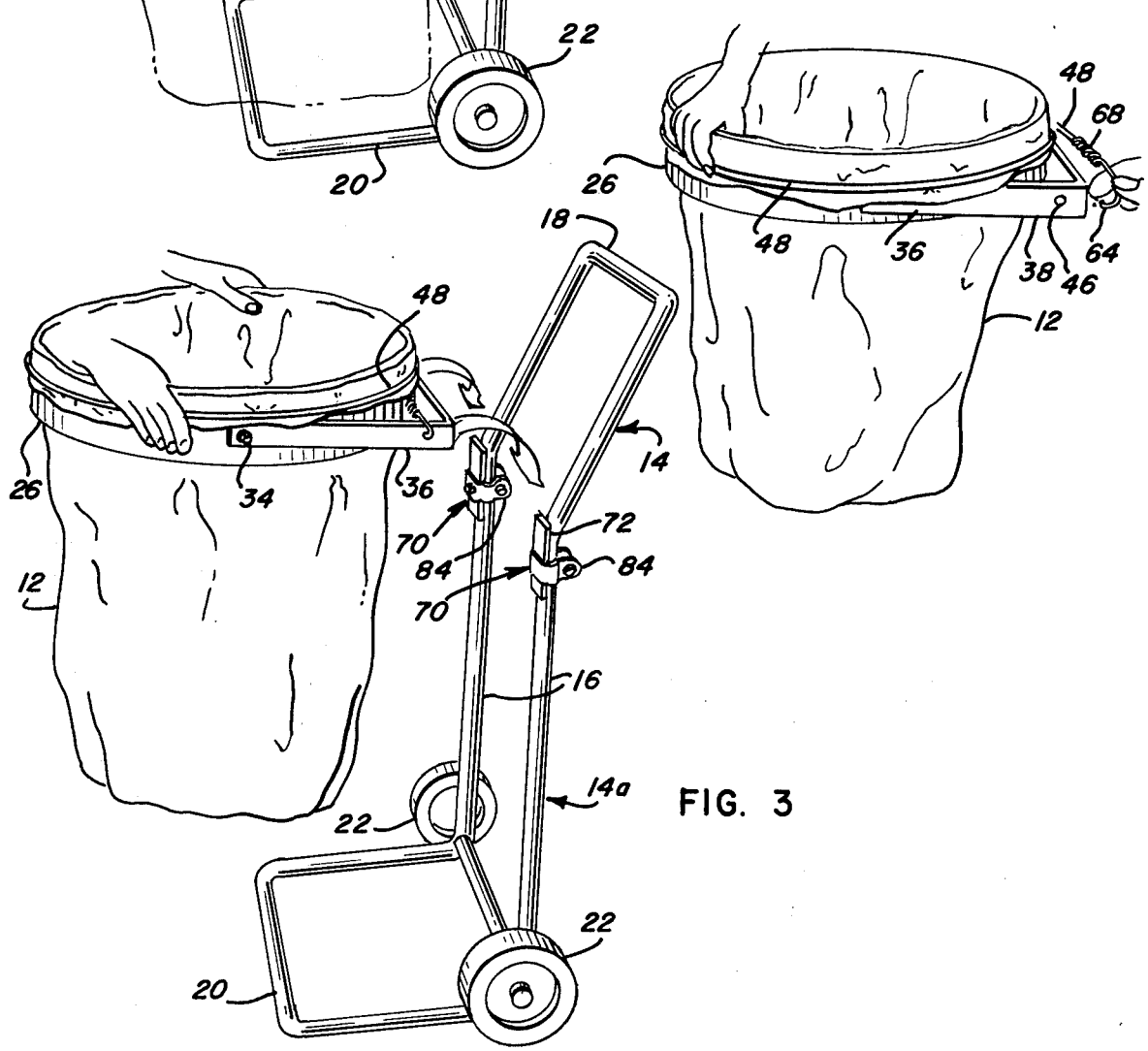
FIG. 2
FIG. 3

BAG HOLDER

BACKGROUND OF THE INVENTION

This invention relates to a bag holder, and more particularly, to a frame assembly for holding trash bags and the like.

Over the years a variety of different types of bag holders have been developed for the purpose of collecting, bagging and disposing of trash, refuse, leaves and other material. Typical of such bag holders are those disclosed in U.S. Pat. Nos. 122,685; 1,548,986; 3,614,041; 3,845,968 and 3,992,034.

Under loading conditions some prior art bag holders have a tendency to buckle, bend or twist as the bag is filled which may cause the bag holder to become permanently deformed and damaged. Moreover, with some types of prior art bag holders it is often awkward and cumbersome to readily insert and remove a flexible plastic bag.

It is therefore desirable to provide a bag holder which overcomes the preceding disadvantages.

SUMMARY OF THE INVENTION

An improved bag holder is provided for firmly supporting a flexible trash bag or the like without bending, buckling or twisting. The bag is readily inserted and removed from an annular shoulder of the rim of a hoop, and is retained by suitable means, such as a spring-biased cord, or other fastener.

In accordance with principles of the present invention, the bag holder includes a generally U-shaped brace having a pair of elongated arms secured to the rim to rigidify and enhance the stability of the hoop. The U-shaped brace includes a mounting bar extending between and connected to the elongated arms of the brace with the height of the mounting bar substantially greater than the thickness of the mounting bar.

At least one removable bracket assembly is provided for mounting upon a support structure, such as a wheeled cart, post or wall. The removable bracket assembly includes an elongated upright support lug and a fastening assembly for securing the lug to the support structure. The fastening assembly further spaces the lug from the support structure to define a pocket therebetween for receiving the mounting bar whereupon the U-shaped brace can be removably cantilevered from the support structure with the support lug engaging and supporting the mounting bar to substantially prevent the brace from buckling, twisting and bending when the bag is filled.

In the preferred form, the fastening assembly includes a generally U-shaped clamp having a pair of clamping arms and a bight connecting the clamping arms. Each of the arms has an intermediate portion for matingly engaging and clampingly embracing the support structure and has an end portion which defines an aperture. A fastener is insertable into the apertures of the clamping arms to detachably fasten the clamping arms against the support structure. An attachment member, such as a bolt, is provided for securing the bight to the upright support lug.

Desirably, the fastening assembly includes a fastener having a portion, such as the head of a bolt, which defines a spacer that is disposed against and between the support lug and the support structure for spacing the support lug from the support structure to define the pocket therebetween.

In the preferred embodiment, the upright support lug has an inclined end which engages and bears against the support structure. Preferably the width of the support lug is generally parallel to the mounting bar and the thickness of the support lug is generally transverse to the mounting bar so that the width of the mounting bar is substantially greater than the thickness of the mounting bar. In the illustrative embodiment the support lug has a pair of opposed, generally planar, side walls including one side wall facing the hoop and another side wall which defines a support surface that faces the support structure.

In the preferred embodiment, the mounting bar has upright sides including an interior side with a generally planar mounting surface. When the U-shaped brace is cantilevered from the support structure the support surface of the upright support lug engages and supports the mounting bar.

Desirably, the retaining cord includes a cord which is constructed and arranged to crisscross adjacent the mounting bar and to circumferentially bear against the hoop. In one form, the cord includes a hook connected to one end of the cord for inserttion into an aperture of one of the arms of the U-shaped brace. The other end of the cord is secured to the other arm of the U-shaped brace and a spring is operatively coupled to both the cord and the hook to increase the tension of the cord around the bag.

When the bag holder is mounted upon the wall, the bag holder can include at least one wall bracket, and preferably two wall brackets. Each of the wall brackets is secured to an intermediate support structure to mount the intermediate support structure to a wall. In some circumstances it is desirable that the support lug be directly mounted to the wall rather than to an intermediate support structure.

For ease of construction and assembly the hoop preferably includes two arcuate hoop sections with fasteners being provided to secure the hoop sections together.

A more detailed explanation of the invention is provided in the following description and appended claims taken in conjunction with the accompanying drawings.

BRIEF DESCRIPTION OF THE DRAWINGS

FIG. 1 is a perspective view of a bag holder in accordance with principles of the present invention mounted upon a wheeled support structure;

FIG. 2 is a perspective view of a portion of the bag holder illustrating insertion of a spring-biased cord;

FIG. 3 is a perspective view of the bag holder illustrating the U-shaped brace preparatory to insertion into the pockets between the support lugs and the wheeled support structure;

DETAILED DESCRIPTION OF THE ILLUSTRATIVE EMBODIMENT

The drawings illustrate a bag holder or frame assembly 10 which firmly supports a bag 12, such as a flexible plastic trash bag. In the illustrative embodiment the bag 12 is used for collecting, bagging and disposing of trash, refuse, garbage, leaves, weeds, grass cuttings and other discardable items and material. In some circumstances it may be desirable to use other types of bags, such as a paper bag, canvas bag or other type of cloth bag. While the bag holder 10 of the present invention is particularly useful for bagging trash and the like it is readily apparent that the bag holder of the present invention can be used for supporting bags for other purposes.

Figure 5:
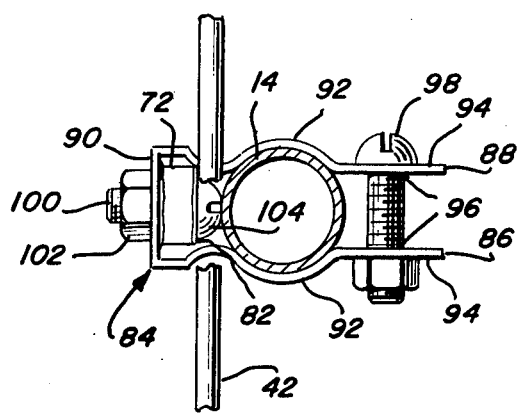
FIG. 5 is a cross-sectional top plan view of the removable bracket assembly taken substantially along line 5—5 of FIG. 4.
Figure 6:
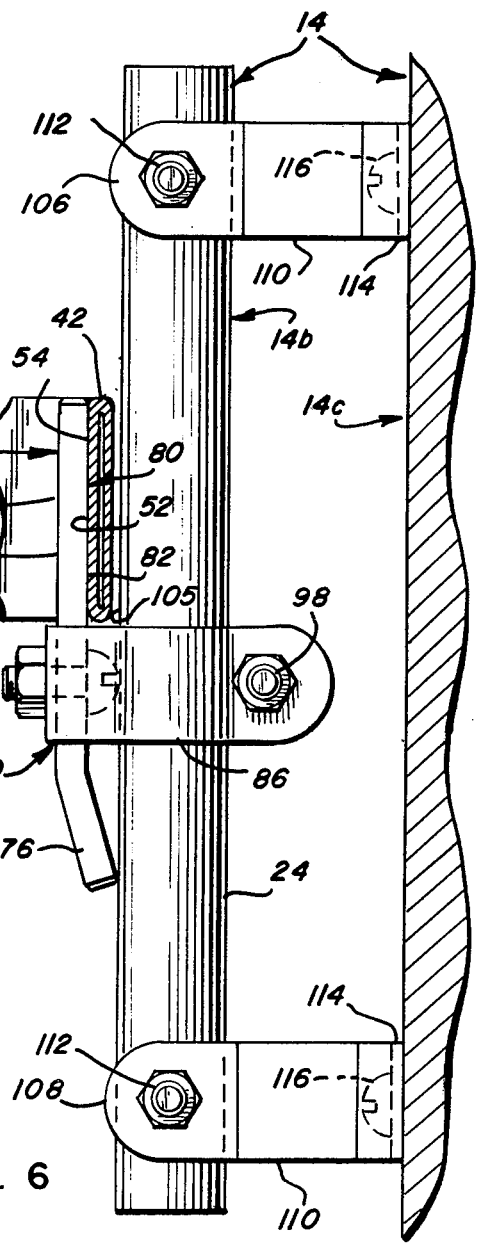
FIG. 6 is a fragmentary cross-sectional side view of a bag holder in accordance with the present invention illustrating the removable bracket assembly mounted upon an intermediate post-like support structure and a plurality of wall brackets securing the intermediate post-like support structure to a wall.

The bag holder 10 is mountable upon a support structure 14, such as a wheeled hand cart 14a as shown in FIGS. 1-5, or upon an intermediate post-like support structure 14b and wall 14c as shown in FIG. 6. The wheeled cart 14a (FIGS. 1 and 3) preferably take the form of a utility hand truck or garden hose reel cart having a pair of upright tubular post-like sections 16 positioned intermediate a handle section 18 and a base or support platform 20. Preferably, the cart 14a has at least two wheels 22 positioned adjacent the outer sides of the post-like sections 16 of the cart 14a.

The support structure 14 shown in FIG. 6 includes a post-like support structure 14b and a wall 14c. The post-like support structure 14b preferably includes a pair of elongated posts 24 which in the illustrative embodiment are tubular and cylindrical in shape. In some circumstances it may be desirable that the bag holder 10 be directly mounted to a wall 14c without the use of any intermediate post-like support structure 14b.

In accordance with the present invention the bag holder 10 includes a circular hoop 26 made out of sheet metal. The hoop 26 has an upper rim or flange 28 (FIG. 1) which provides an annular shoulder 30 for carrying the open bag 12. Desirably, the upper edge of the shoulder 30 is rounded so as not to cut or pierce the bag 12. The hoop 26 has a lower rim or flange 31 which is similar and symmetrical to the upper rim or flange 28.

Figure 7:
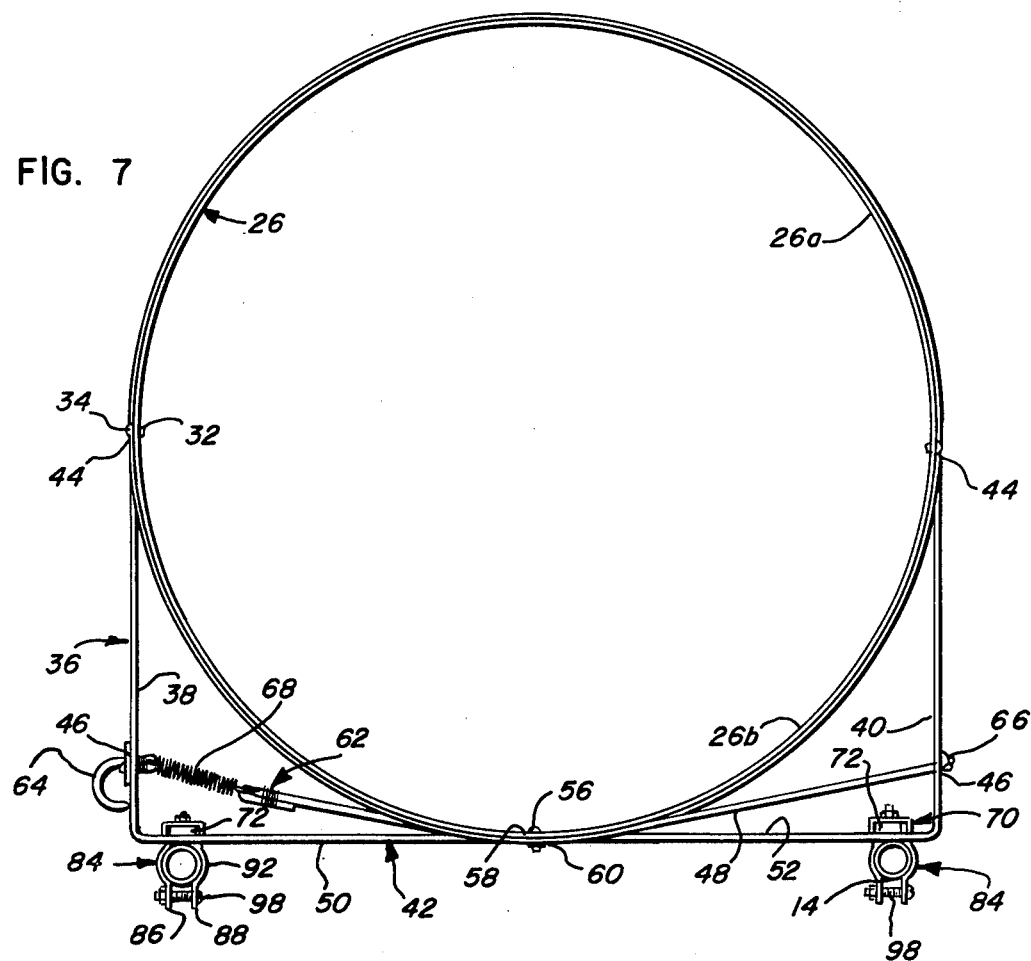
FIG. 7 is a top plan view of the bag holder.

For ease of construction and assembly the hoop 26 is preferably constructed of two arcuate sections 26a and 26b (FIG. 7). In the illustrative embodiment the hoop sections 26a and 26b are semi-circular and identical in size, although in some circumstances it may be desirable that the hoop sections have different arcuate dimensions. Each of the arcuate sections 26a and 26b are suitably apertured adjacent the ends of each arcuate section to provide aligned mounting holes 32 approximately in the middle of the hoop 26. Bolts 34 or other fasteners are provided for insertion into the mounting holes 32 of the arcuate hoop sections 26a and 26b for securing the arcuate hoop sections 26a and 26b together to form the hoop 26.

In order to rigidify and enhance the stability of the hoop 26 a generally U-shaped brace 36 is provided with a pair of elongated rigidifying arms 38 and 40 and with a mounting bar 42 integrally extending between and connecting the arms 38 and 40. The corners of the U-shaped brace 36 formed from the junction of the arms 38 and 40 and the mounting bar 42 are generally perpendicular. In the illustrative embodiment the U-shaped brace is made out of metal and the arms 38 and 40 and the mounting bar 42 are all of the same height.

Each of the arms 38 and 40 of the U-shaped brace 36 is of a length so that its end extends slightly in front of the middle of the hoop 26 as best shown in FIGS. 1 and 7. The front end of each arm 38 and 40 in the illustrative embodiment has a pair of mounting apertures 44 (FIG. 7) which are aligned with the mounting holes 32 in the hoop sections 26a and 26b so that the bolts 34 are insertable in the mounting apertures 44 as well as the mounting holes 32 to secure the arms 38 and 40 and the hoop section 26a and 26b together. The end of each arm 38 and 40 adjacent the mounting bar 42 is provided with a cord-receiving aperture 46 (FIG. 2) for receiving a cinch cord 48 as will be hereinafter explained.

The mounting bar 42 of the U-shaped brace 36 is of a height and thickness such that the height of the mounting bar 42 is substantially greater than the thickness of the mounting bar 42. Structurally, the mounting bar 42 has upright sides including an exterior side 50 (FIGS. 7 and 8), which generally face the support structure 14, and an interior side 52 (FIGS. 4, 6 and 7) which has a generally planar mounting surface 54 that faces the hoop 26.

In the preferred embodiment, the arms 38 and 40 and the mounting bar 42 of the U-shaped brace 36 tangentially abut against the sides and the rearward end of the hoop sections 26a and 26b as best shown in FIG. 7. To provide additional support for the brace 36, fasteners such as mounting-bar bolts 56 (FIG. 7) are provided to secure the mounting bar 42 and the rearwardmost hoop section 26b together through aligned apertures 58 and 60 in the mounting bar 42 and the rearwardmost hoop section 26b, respectively.

Figure 8:
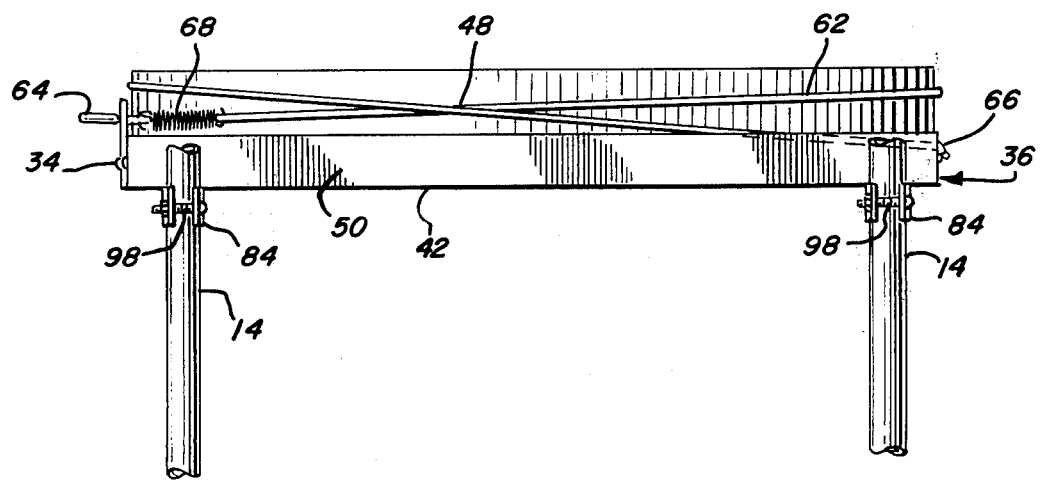
FIG. 8 is a back view of the bag holder.

A retainer 62 is operatively associated with the hoop 26 for retaining the open bag 12 on the rim 28 of the hoop 26. In the illustrative embodiment the retainer takes the form of a cord 48 which is crisscrossed adjacent the mounting bar 42 as best shown in FIG. 8. The cord 48 circumferentally engages the hoop 26 so as to releasably clamp the upper end of the bag 12 around the rim 28 of the hoop 26.

In the illustrative embodiment the cord 48 is made of flexible 18 gauge wire, although it may be desirable in some circumstances that the cord be made of an elastic band, rope, chain, a plastic strap or some other type of wire. Desirably, a hook 64 (FIGS. 2, 7 and 8) is connected to one end of the cord 48 for insertion into one of the cord-receiving apertures 46 of one of the arms 38 of the U-shaped brace 36 so that the hook 64 is removably attached to the arm 38. The other end of the cord is passed through the other cord-receiving aperture 46 of the other arm 40 and is suitably tied to form a knot 66 at its end, which is of a larger size than the adjacent cord-receiving aperture 46 so that the knot 66 firmly engages the arm 40.

A spring 68 is operatively coupled to both the cord 48 and the hook 64 to increase the tension of the cord 48 around the bag 12. In the illustrative embodiment the spring 68 takes the form of a tension spring. Other types of springs can be used when desired. In some circumstances it may be desirable to provide a hook or a nut or other fastener at the other end of the cord in lieu of the knot 66. Furthermore, it may be desirable in some circumstances to position the spring away from the hook 64 in the middle of the cord.

One of the features of the present invention is the provision of a pair of removable bracket assemblies 70 (FIG. 3) which are removably mountable upon the support structure 14. Each of the removable bracket assemblies 70 include an elongated upright support lug 72 (FIGS. 4 and 5) which is formed of rigid metal.

When properly orientated the width of the support lug 72 is generally parallel to the mounting bar 42 and the thickness is generally transverse to the mounting bar 42. The width of the support lug 72 is substantially greater than its thickness. The support lug 72 has an upper elongated finger-like end 74, which is rectangular when viewed from the hoop 26 (FIG. 3), and has a downwardly depending inclined end 76 which engages and bears against the support structure 14. The support lug has generally planar side walls including one side wall 78 of the upper finger-like end 74 facing the hoop 26 and another side wall 80 of the upper finger-like end 74 defining a support surface 82 which faces the support structure 14.

Figure 4:
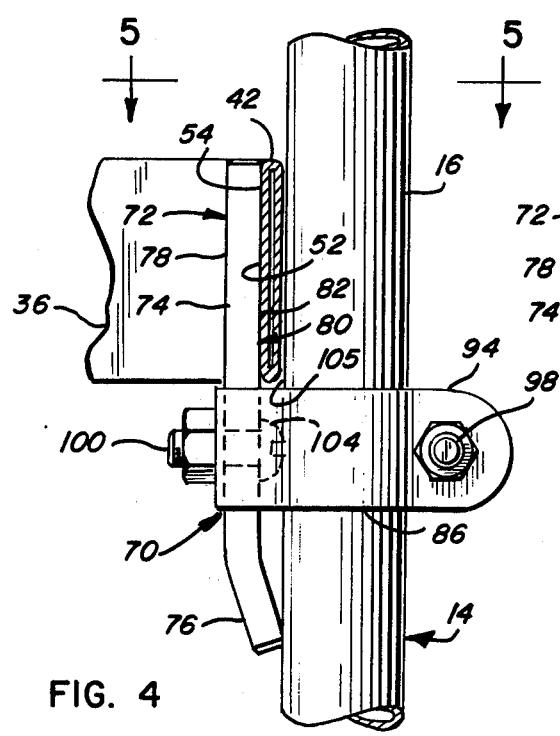
FIG. 4 is an enlarged fragmentary cross-sectional side view of the removable bracket assembly of the present invention.

In the preferred embodiment each of the removable bracket assemblies 70 include a generally U-shaped clamp 84 (FIGS. 3 and 5). Each U-shaped clamp 84 has a pair of clamping arms 86 and 88 (FIG. 5) and a bight or connecting portion 90 integrally connecting the clamping arms 86 and 88. Each of the clamping arms 86 and 88 has an intermediate arcuate portion 92 which is bowed outwardly to matingly engage and clampingly embrace the support structure 14, i.e., the post-like section 16 of the cart 14a as shown in FIG. 4 or of the post-like support structure 14b of FIG. 6.

The end portion 94 of each clamping arm 86 or 88 defines an arm aperture 96 (FIG. 5). Bolts 98 or other fasteners are provided for insertion into the arm apertures 96 to detachably fasten the clamping arms 86 and 88 against the support structure 14.

Desirably, a threaded fastener 100 such as a screw or bolt is inserted into aligned apertures in the bight 90 and the upper finger-like end 74 of the lug 72, respectively. The fastener 100 is secured by a nut 102. A lock washer (not shown) can be positioned on the threaded fastener 100 between the lug 72 and the bight 90 of the clamp 84. In the preferred embodiment the head 104 of the fastener 100 defines a spacer which is positioned against and between the support surface 82 (FIG. 4) of the support lug 72 and the support structure 14, i.e., the post-like section 16 of wheeled cart 14a (FIG. 4) or the post-like support structure (FIG. 6) to space the support surface 82 (FIGS. 4 and 6) of the support lug 72 from the support structure 14. It may be desirable in some circumstances to utilize another portion of the fastener 100 as a spacer, such as the nut 102 if the fastener were turned around so that its head 104 faced the hoop 26. Alternatively, a spacer or shim can be provided between the mounting bar 42 and bight 90.

In the illustrative embodiment, the U-shaped clamp 84 and bolts 98 and 100 (FIG. 5) collectively secure the lug 72 to the support structure 14 and the portion 104 of the fastener 100 spaces the lug 72 apart from the support structure 14 to define a pocket 105 (FIG. 4) which receives the mounting bar 42. As shown in FIGS. 1, 4 and 6, the U-shaped brace 36 is removably cantilevered from the support structure 14 with the support surface 82 of the upright support lug 72 positioned to engage and support the mounting surface 54 of the mounting bar 42 to substantially prevent the brace 36 from buckling, twisting and bending when the bag 12 is filled. Thus, the construction of the present invention substantially prevents the bag holder 10 from being distorted, permanently deformed and damaged when the bag 12 is filled.

In the wall mounted bag holder shown in FIG. 6, each of the removable bracket assemblies 70 is attached to a post 24 of a post-like support structure 14b. To each post is mounted an upper wall bracket 106, positioned above the removable bracket assembly 70, and a lower wall bracket 108, positioned below the removable bracket assembly 70. Each of the wall brackets 106 and 108 has at least one elongated arm 110 secured to the post 24 by means of a bolt 112 or other fastener and has a laterally extending mounting flange 114 which extends inwardly from the end of the arm 110 and is fastened to a wall 14c by suitable fastening means 116 such as a screw, toggle-bolt or hollow wall fastener.

In some situations it may be desirable to mount the lug 72 directly to a wall 14c without the use of an intermediate post 24. This may be accomplished by simply fastening the lug 72 to the wall 14c with a screw, or toggle-bolt.

While the hoop 26, the U-shaped brace 36, lug 72 and clamp 84 are preferably made of metal, other materials can be used such as impact-resistant plastic, fiber-glass or wood.

When the bag is being installed on the bag holder 10, such as the wheeled bag holder illustrated in FIG. 1, the cord 48 should be unhooked from the U-shaped brace 36 and removed from the hoop 26 so that the open end of the bag 12 can be folded over the annular shoulder 30 of the rim 28 of the hoop 26. Subsequently, the cord should be wrapped around the overlapping portion of the open end of the bag 12 as shown in FIG. 2 and the hook 64 attached to the arm 38 of the brace 36 with the cord 48 crisscrossed as shown in FIG. 8 so that the cord 48 is held taut against the bag 12 to securely hold the open end of the bag 12 against the hoop 26. The installed bag can then be releasably mounted onto the wheeled cart 14a as shown in FIG. 3 or upon a post-like support structure 14b as shown in FIG. 6 and can be removed by reversing the preceding steps. In some circumstances it may be desirable to insert the bag 12 upon the hoop 26 after the brace 36 is inserted into the pocket 105 between the lug 72 and the support structure 14.

When the bag 12 is filled, the hook 64 (FIG. 2) should be removed from the arm 38 of the brace 36 and the cord 48 removed from the bag 12 to permit the filled bag 12 to drop upon the base 20 of the cart 14a and be tied and subsequently wheeled to the curb or alley for pick-up and collection.

Although embodiments of this invention have been shown and described, it is to be understood that various modifications and substitutions can be made by those skilled in the art without departing from the novel spirit and scope of this invention.

What is desired to be protected and secured by Letters Patent of the United States is:

1. A wheeled bag holder, comprising:
   hoop means having a rim defining an annular shoulder for carrying an open bag;
   cord-like means operatively associated with said hoop means for releasably retaining said open bag on said rim;
   a generally U-shaped brace having a pair of elongated arms secured to opposite sides of said rim for rigidifying and enhancing the stability of said hoop means and a mounting bar extending between and connected to said elongated arms, the height of said mounting bar being substantially greater than the thickness thereof with said mounting bar having upright sides including an interior side with a generally planar mounting surface;

a hand cart having at least two wheels and a pair of post-like sections;

a pair of removable bracket assemblies, each of said removable bracket assemblies being detachably connected to one of said post-like sections and including an elongated upright support lug having a width generally parallel to said mounting bar and a thickness generally transverse to said mounting bar such that the width is substantially greater than the thickness, said upright support lug having a pair of opposed generally planar side walls including one side wall facing said hoop means and another side wall defining a support surface facing one of said post-like sections of said hand cart and having an inclined end for engaging and bearing against said one of said post-like sections, a generally U-shaped clamp including a pair of clamping arms with each clamping arm having an intermediate arcuate portion for matingly engaging and clampingly embracing one of said post-like sections of said hand cart and an end portion defining an aperture, said clamp including a bight connecting said clamping arms, attachment means for securing said bight to said upright support lug, said attachment means including a fastener having a portion disposed against and between said support surface of said support lug and said one of said post-like sections for spacing said support surface of said support lug from said one of said post-like sections, fastening means insertable in the apertures of said clamping arms for detachably fastening said clamping arms against said one of said post-like sections, and said support surface of said upright support lug and said one of said post-like sections of said hand cart together defining a pocket for receiving said mounting bar so that said U-shaped brace is removably cantilevered from said hand cart with said support surface of said upright support lug engaging and supporting said mounting surface of said mounting bar for substantially preventing said brace from buckling, twisting and bending when said bag is filled.

2. A wheeled bag holder in accordance with claim 1, wherein:

each of said elongated arms of said U-shaped brace define an aperture, and said cord-like means include a cord circumferentially disposed around said hoop means and crisscrossed adjacent said mounting bar, said cord passing through one of said apertures of said arms and having a knot at its end of a larger size than said one of said apertures for engaging said arm, a hook connected to one end of the cord for insertion into the other of said apertures and for removable attachment to the other of said elongated arms and spring means operatively coupled to said cord and said hook for increasing the tension of said cord-like means around said bag.

3. A wall-mounted bag holder, comprising:

hoop means having a rim defining an annular shoulder for carrying an open bag;

cord-like means operatively associated with said hoop means for releasably retaining said open bag to said rim;

a generally U-shaped brace having a pair of elongated arms secured to said rim for rigidifying and enhancing the stability of said hoop means and a mounting bar extending between and connected to said elongated arms, the height of said mounting bar being substantially greater than the thickness thereof with said mounting bar having upright sides including an interior side with a generally planar interior mounting surface;

a support structure including a pair of posts;

a pair of removable bracket assemblies detachably connected to said support structure with one removable bracket assembly detachably connected to one of said posts and the other removable assembly detachably connected to the other of said posts, each of said removable bracket assemblies including an elongated upright support lug having a width generally parallel to said mounting bar and a thickness generally transverse to said mounting bar such that the width is substantially greater than the thickness, said upright support lug having a pair of opposed generally planar side walls including one side wall facing said hoop means and another side wall defining a support surface facing one of said posts of said support structure and having an inclined end for engaging and bearing against said one of posts, a generally U-shaped clamp including a pair of clamping arms with each clamping arm having an intermediate portion for matingly engaging and clampingly embracing said one of said posts and an end portion defining an aperture, said clamp including a bight connecting said clamping arms, attachment means for securing said bight to said upright support lug including a fastener having a portion disposed against and between said support surface of said support lug and said one of said posts for spacing said support surface of said support lug from said one of said post-like sections, fastening means insertable in the apertures of said clamping arms for detachably fastening said clamping arms against said one of said posts, and said support surface of said upright support lug and said one of said posts of said support structure together defining a pocket for receiving said mounting bar so that said U-shaped brace is removably cantilevered from said support structure with said support surface of said upright support lug engaging and supporting said mounting surface of said mounting bar for substantially preventing said brace from buckling, twisting and bending when said bag is filled; and bracket means including at least one wall bracket attached to each post for mounting said support structure to a wall.

4. A wall mounted bag holder in accordance with claim 3 wherein:

said bracket means include at least two wall brackets attached to each post including one wall bracket disposed above said removable bracket assembly and another wall bracket positioned below said removable bracket assembly.

5. A bag holder mountable upon a support structure, comprising:

hoop means having a rim defining an annular shoulder for carrying an open bag;

means operatively associated with said hoop means for retaining said open bag on said rim;

a generally U-shaped brace having a pair of elongated arms secured to said rim for rigidifying and enhancing the stability of said hoop means and a mounting bar extending between and connected to said elongated arms, the height of said mounting bar being substantially greater than the thickness thereof;

at least one removable bracket assembly mountable upon a support structure including an elongated upright support lug and means for securing said lug to said support structure and for spacing said lug from said support structure to define a pocket therebetween for receiving said mounting bar so that said U-shaped brace is removably cantilevered from said support structure with said support lug engaging and supporting said mounting bar to substantially prevent said brace from buckling, twisting and bending when said bag is filled;

said means for securing said lug to said support structure including a generally U-shaped clamp having a pair of clamping arms and a bight connecting said clamping arms, each of said arms having an intermediate portion for matingly engaging and clampingly embracing said support structure and an end portion defining an aperture, fastening means insertable in the apertures of said clamping arms for detachably fastening said clamping arms against said support structure, and attachment means for securing said bight to said upright support lug, and said attachment means defining a spacer disposed against and between said support lug and said support structure for spacing said support lug from said support structure.

6. A bag holder mountable upon a support structure, comprising:

hoop means having a rim defining an annular shoulder for carrying an open bag;

means operatively associated with said hoop means for retaining said open bag on said rim;

a generally U-shaped brace having a pair of elongated arms secured to said rim for rigidifying and enhancing the stability of said hoop means and a mounting bar extending between and connected to said elongated arms, the height of said mounting bar being substantially greater than the thickness thereof;

at least one removable bracket assembly mountable upon a support structure including an elongated upright support lug and means for securing said lug to said support structure and for spacing said lug from said support structure to define a pocket therebetween for receiving said mounting bar so that said U-shaped brace is removably cantilevered from said support structure with said support lug engaging and supporting said mounting bar to substantially prevent said brace from buckling, twisting and bending when said bag is filled;

said means for securing said lug to said support structure including a generally U-shaped clamp having a pair of clamping arms and a bight connecting said clamping arms, each of said arms having an intermediate portion for matingly engaging and clampingly embracing said support structure and an end portion defining an aperture, fastening means insertable in the apertures of said clamping arms for detachably fastening said clamping arms against said support structure, and attachment means for securing said bight to said upright support lug;

said attachment means including a fastener having a head defining a spacer disposed against and between said support lug and said support structure for spacing said support lug from said support structure.

7. A support assembly adapted to be mounted upon a pair of post-like sections, comprising:

a removable mounting bar extending between said post-like sections;

a pair of removable bracket assemblies, each of said removable bracket assemblies being detachably connected to one of said post-like sections and including an elongated upright support lug having a width generally parallel to said mounting bar and a thickness generally transverse to said mounting bar such that the width is substantially greater than the thickness, said upright support lug having a pair of opposed generally planar side walls including one side wall facing generally opposite said post-like sections and another side wall defining a support surface facing toward one of said post-like sections, said lug having an inclined end for engaging and bearing against said one of said post-like sections, a generally U-shaped clamp including a pair of clamping arms with each clamping arm having an intermediate arcuate portion for matingly engaging and clampingly embracing one of said post-like sections and an end portion defining an aperture, said clamp including a bight connecting said clamping arms, attachment means for securing said bight to said upright support lug, said attachment means including a fastener having a portion disposed against and between said support surface of said support lug and said one of said post-like sections for spacing said support surface of said support lug from said one of said post-like sections, fastening means insertable in the apertures of said clamping arms for detachably fastening said clamping arms against said one of said post-like sections, and said support surface of said upright support lug and said one of said post-like sections together defining a pocket for receiving said mounting bar.

* * * * *